(12) United States Patent
Hebener et al.

(10) Patent No.: US 6,240,807 B1
(45) Date of Patent: Jun. 5, 2001

(54) INDEXING APPARATUS

(75) Inventors: Helmut Hebener, Frankfurt (DE); Jeffrey M. Warth, Mars, PA (US)

(73) Assignee: Chick Workholding Solutions, Inc., Warrendale, PA (US)

( * ) Notice: Subject to any disclaimer, the term of this patent is extended or adjusted under 35 U.S.C. 154(b) by 0 days.

(21) Appl. No.: 09/261,723

(22) Filed: Mar. 3, 1999

(51) Int. Cl.[7] .................................................. B23B 29/24
(52) U.S. Cl. ..................... 74/813 R; 74/813 L; 74/826; 269/43; 269/63; 269/88
(58) Field of Search ................... 74/813 R, 813 L, 74/813 C, 814–827; 269/43, 63, 152, 88; 29/48.5 A, 48.5 R

(56) References Cited

U.S. PATENT DOCUMENTS

| | | |
|---|---|---|
| 731,871 | 6/1903 | Echols . |
| 1,495,772 | 5/1924 | Brown . |
| 2,339,986 | 1/1944 | Engert . |
| 2,369,425 | 2/1945 | Becker . |
| 2,406,043 | 8/1946 | Sorensen . |
| 2,885,910 | 5/1959 | Waller . |
| 2,952,169 | 9/1960 | Johnson . |
| 2,976,844 | 3/1961 | Goldring . |
| 3,020,998 | 2/1962 | Webb . |
| 3,162,064 | 12/1964 | Musy . |
| 3,186,260 | 6/1965 | Dugas . |
| 3,204,490 | 9/1965 | Jones et al. . |
| 3,496,832 | 2/1970 | Celinder et al. . |
| 3,612,384 | 10/1971 | Loyd . |
| 3,968,415 | 7/1976 | Hafla et al. . |
| 4,324,161 | 4/1982 | Klancnik et al. . |
| 4,353,271 | 10/1982 | Pieczulewski . |
| 4,524,655 | 6/1985 | Waldron et al. . |
| 4,643,411 | 2/1987 | Izumi . |

(List continued on next page.)

FOREIGN PATENT DOCUMENTS

| | | |
|---|---|---|
| 480 912 | 12/1969 | (CH) . |
| 1652956 | 10/1962 | (DE) . |
| 1918387 | 4/1969 | (DE) . |
| 1652956 | 6/1969 | (DE) . |

(List continued on next page.)

OTHER PUBLICATIONS

Chick Workholding Solutions, Inc.; Pneu dex, An Innovative New Concept in Workholding, Warrendale, Pennsylvania, Aug. 1998.*

(List continued on next page.)

*Primary Examiner*—Vinh T. Luong
(74) *Attorney, Agent, or Firm*—Kirkpatrick & Lockhart LLP

(57) ABSTRACT

An indexing apparatus for selectively indexing a payload about an axis. The apparatus includes a housing that supports an indexable support table. A second retainer is provided on the indexable support table that is adapted to selectively axially engage a first retainer on the housing to lock the indexable support table in any one of a plurality of selected rotational positions about the axis. The apparatus also includes an axial displacement member that is movably supported within the housing to selectively engage the indexable support table while the indexable support table is locked in any one of the preselected rotational positions. Thereafter, the axial displacement member biases the indexable support table in a first axial direction out of the locked position and applies a rotational force to the indexable support table to rotate it a desired amount about the axis. After the indexable table has been rotated, a biaser causes the indexable support table to move in a second axial direction until the first and second retainers are re-engaged to lock the indexable support table in the selected rotational position. The apparatus may also include a device for detecting when the indexable support table is in a "zero" or "home" position.

16 Claims, 13 Drawing Sheets

U.S. PATENT DOCUMENTS

| | | |
|---|---|---|
| 4,644,825 | 2/1987 | Yamazaki . |
| 4,884,474 | 12/1989 | Kawata . |
| 4,921,378 | 5/1990 | Kytölä . |
| 4,936,559 | 6/1990 | Diax Torga . |
| 4,991,463 | 2/1991 | Kawata . |
| 5,064,321 | 11/1991 | Barnes . |
| 5,094,436 | 3/1992 | Stephan, III . |
| 5,136,896 | 8/1992 | Burka . |
| 5,339,504 * | 8/1994 | Thumm et al. .................... 29/48.5 A |
| 5,501,123 | 3/1996 | Swann et al. . |
| 5,526,715 | 6/1996 | Swann et al. . |
| 5,562,277 * | 10/1996 | Swann et al. .......................... 269/43 |
| 5,735,514 * | 4/1998 | Moore et al. .......................... 269/43 |

FOREIGN PATENT DOCUMENTS

| | | |
|---|---|---|
| 1750374 | 1/1971 | (DE) . |
| 2 407 554 | 9/1974 | (DE) . |
| 27 53 507 | 6/1979 | (DE) . |
| 0 343 329 | 11/1989 | (EP) . |
| 0 450 538 A2 | 9/1991 | (EP) . |
| 2 307 602 | 3/1976 | (FR) . |
| 1 266 942 | 3/1972 | (GB) . |
| 2 075 874 | 2/1981 | (GB) . |
| 2 073 063 | 10/1981 | (GB) . |
| 2 103 522 | 7/1982 | (GB) . |
| 55-18370 | 2/1980 | (JP) . |
| 56-114648 | 9/1981 | (JP) . |
| 61-24446 | 10/1986 | (JP) . |
| 1397-250 | 5/1988 | (SU) . |
| 89/08518 | 11/1988 | (WO) . |
| WO 97/08594 | 3/1997 | (WO) . |
| WO 97/47429 | 12/1997 | (WO) . |

OTHER PUBLICATIONS

Chick Workholding Solutions, Vise Fixturing Tomorrow's Workholding; Warrendale, Pennsylvania; Mar. 1993.

U.S. Patent application Ser. No. 08/661,190, filed Jun. 10, 1996 (now abandoned).

Chick Machine Tool, Inc.; Chick Vise Fixturing Brochure; Warrendale, Pennsylvania; 1990.

Chick Machine Company; Chick Multi–Lok/8 Brochure; Warrendale, Pennsylvania; 1989.

Chick Machine Tool, Inc.; Chick Multi–Lok Workholding for Your Mazak Brochure; Warrendale, Pennsylvania; 1992.

Chick Machine Tool, Inc.; Chick Multi–Lok—The Workholding System for Your Tsugami Brochure; Warrendale, Pennsylvania; 1992.

Chick Machine Tool, Inc.; Chick Multi–Dex Brochure; Warrendale, Pennsylvania; 1993.

Chick Machine Tool, Inc.; Chick Quick Change Workholding brochure; Warrendale, Pennsylvania; 1993.

Chick Machine Tool, Inc.; Chick M–Series Brochure; Warrendale, Pennsylvania; 1993.

ITW Spiroid; Endicon Precision Index and Coupling Rings Brochure; Glenview, Illinois; 1987.

* cited by examiner

INDEXING APPARATUS

BACKGROUND OF THE INVENTION

1. Field of the Invention

The present invention relates to indexing apparatuses and, more particularly, is directed to indexable apparatuses for selectively orienting objects such as workholding devices in precise predetermined positions.

2. Description of the Invention Background

A number of different apparatuses have been developed for indexing a variety of articles between manufacturing operations to increase the efficiency of the manufacturing process. For example, various types of indexing apparatuses are typically used to accurately present a workpiece in a predetermined orientation relative to the spindle of a machining device such as a milling machine or the like.

One type of indexing device is disclosed in U.S. Pat. No. 2,339,986 to Engert. The device in that patent comprises an indexable device for indexing a shaft into a variety of different machining orientations about a single axis. While this device can support a shaft in various orientations to enable, for example, keyways to be cut in different locations on the shaft, the device can only hold a single shaft at a time and is ill-suited for supporting non-cylindrical workpieces.

Another indexable device is disclosed in U.S. Pat. No. 3,020,998 to Webb. That device comprises a turntable adapted to be indexed by the cyclic operation of a ratchet and pawl mechanism. A plurality of vise-like workholders are supported on the table and are adapted to be indexed about an axis such that the workholders can be positioned in various orientations relative to metal bending or crimping apparatus. This device, however, can only support workpieces in a single planar orientation about the device's axis. Moreover, the ratchet and pawl system cannot be used to index the workholders to very precise angular orientations.

U.S. Pat. No. 2,369,425 to Becker discloses an indexable workholding device that comprises a frame that is adapted for attachment to the machining table of a machining device such as drill press. A disk is rotatably attached to the frame and may be rotated about an axis and secured in a predetermined position by clamping members attached to the frame. The top of the disk is also configured to accept workpiece holding clamps thereon. The outer edge of the disc is provided with a vernier scale that cooperates with an indicator on the frame to very precisely indicate the rotational position of the disc relative to the frame. The workpiece accuracy is dependent upon the secure clamping of the disk in position and the secure clamping of the workpiece on the disk. If either the workpiece or the disk moves even slightly, the workpiece accuracy will be compromised. A similar apparatus for retaining workpieces at selective angles is also disclosed in U.S. Pat. No. 2,406,043 to Sorensen. That device also comprises a rotatable plate member that is equipped with a plurality of threaded apertures adapted to receive workholding clamping members therein. Although this device is capable of indexing a workpiece at relatively precise angular orientations, if the clamping assemblies attaching the workpiece move, the workpiece accuracy is compromised.

U.S. Pat. No. 4,324,161 to Klancnik, et al. discloses an automatic turret lathe that includes a pneumatically indexable turret. The turret is rotated by an air operated rack and pinion arrangement. After rotating to a desired position, the turret is retained by a "curvic" coupling arrangement. However, if the turret is supporting a payload that is eccentrically mounted such that it applies a torque to the turret, such torque could cause the curvic coupling to slip during its disengagement.

Today, many machine tools are computer or numerically controlled which enables such tools to outproduce their manually operated counterparts. In an effort to reduce the time necessary to index a workpiece or a series of workpieces for presentation to the machine tool, pneumatically and hydraulically operated indexing devices, which can be automatically controlled by the machine tool control system, have been developed. Such systems enable the workpieces to be automatically indexed to various predetermined orientations consistent with successive machining operations. The locking forces generated by such devices, however, are dependent upon the constant supply of the pressurized fluid to the device. Thus, if the fluid pressure is accidentally lost or discontinued, those indexing apparatuses can become unlocked and expose their payloads to damage from inadvertent contact with the machine tool.

In addition, indexing apparatuses are often exposed to large torques generated when large machining forces are applied at considerable distances from the central axis of the indexing apparatus. For example, drilling a 22.2 mm (0.875") diameter hole in steel would require a thrust of about 10,000 N (2300 lbs.). This force, if applied 100 mm (3.9") from center, would apply 1000N-m (750 ft-lbs.) of torque to the indexing apparatus. Such forces can cause the indexing apparatus to inadvertently slip during a machining operation. Thus, large locking forces are desired for retaining the indexing device in a locked position during machining. However, because the locking forces generated by prior fluid-actuated indexing apparatuses are dependent upon the magnitude and maintenance of the pressurized fluid to the device, if there is an undetected leak in the fluid supply system, the locking forces can be compromised.

Also, prior fluid-actuated indexing apparatuses that are automatically controlled by the machine tool controller lack means for automatically confirming that the indexing apparatus is in a "zero" or "home" position prior to initiating the machining operations. Thus, the operator must inspect the position of the indexing apparatus prior to starting the machining process. If the indexing apparatus is not in a starting position and the machining operation is accidentally commenced, the workholding devices and/or the workpiece (s) could be damaged by the machine tool.

Thus, there is a need for a fluid-actuated indexing apparatus that remains in a locked position when the supply of pressurized fluid is accidentally interrupted or discontinued from the apparatus.

There is a further need for an indexing apparatus that has means for signaling the operator and/or the computerized system controlling the apparatus that the apparatus is in a starting position.

Another need exists for an indexing apparatus that has means for signaling when the apparatus is locked in position.

There is still another need for an indexing apparatus that can accurately index loads that are eccentrically mounted thereto.

SUMMARY OF THE INVENTION

In accordance with the present invention, there is provided an indexable apparatus that comprises a housing and an indexable support table movably supported on the housing for selective axial and rotational travel about a first axis. The apparatus further includes a first retainer located on the housing and a second retainer on the indexable support table.

The second retainer is oriented for selective engagement with the first retainer to non-rotatably retain the indexable support table in a desired position. The apparatus also includes an axial displacement member that is movably supported within the housing for selective engagement with the indexable support table to bias the indexable support table in a first axial direction along the first axis such that the second retainer is biased out of engagement with the first retainer and wherein the axial displacement member prevents the indexable support table from rotating about the first axis as the second retainer is disengaged from the first retainer. In addition, a rotator is supported within the housing for applying a rotational force to the indexable support table to cause the indexable support table to rotate about the first axis after the second retainer has disengaged said first retainer.

The present invention may also comprise a fluid-actuated apparatus for selectively indexing a payload about an axis. The apparatus includes a housing that has a first retainer portion thereon and defines a first axis. The apparatus further includes an indexable support table that is movably supported on the housing for selective axial and rotational travel about the first axis. The indexable support table has a second retainer portion adapted to selectively engage the first retainer portion on the housing to selectively prevent the indexable support table from rotation about the first axis. An indexing assembly is supported within the housing and communicates with a source of pressurized fluid for receiving pressurized fluid therefrom such that upon an application of a first amount of pressurized fluid to the indexing assembly, an axial displacement member of the indexing assembly engages the indexable support table while the second retainer is engaged with the first retainer. Upon a further application of the first amount of pressurized fluid to the indexing assembly, the axial displacement member biases the indexable support table in a first axial direction along the first axis to bias the second retainer out of engagement with the first retainer to permit the indexable support table to rotate about the first axis. Upon an application of a second amount of pressurized fluid to the indexing assembly, a rotator portion of the indexing assembly rotates the indexable support table about the first axis to a preselected rotational position. When the application of the first amount of pressurized fluid is discontinued from the indexing assembly and a primary amount of pressurized fluid is applied thereto, the indexable support table is axially displaced in a second axial direction along the first axis opposite to the first axial direction to permit the second retainer portion to reengage the first retainer portion.

The apparatus may also be equipped with a device for detecting when the indexable support table is in a specified rotational position and generating a useable signal for signaling the operator or for use by the system controlling the machine tool. In addition, the apparatus may also be advantageously provided with means for generating a useable signal when the first retainer portion of the indexable support table engages the second retainer portion.

Thus, it is a feature of the present invention to provide an indexable apparatus that can be used to index a variety of different articles about an axis to very precise angular orientations.

It is another feature of the present invention to provide an indexable apparatus with the above-mentioned attributes that can rigidly retain the article(s) attached thereto in the predetermined angular orientation(s).

It is a further feature of the invention to provide a fluid-actuated indexable workholding apparatus that is equipped with means for automatically determining whether the indexable support table thereof is in a desired starting position.

Still another feature of the present invention is to provide an indexing apparatus that includes means for automatically determining when it is locked in any one of a plurality of positions.

It is yet another feature of the present invention to provide a fluid-actuated apparatus that will remain in a locked position should the supply of pressurized fluid be accidentally lost or discontinued.

Accordingly, the present invention addresses the foregoing problems associated with other fluid-actuated indexable apparatuses. In addition to the forgoing mentioned advantages, other details, objects, and advantages will become apparent as the following detailed description of the present preferred embodiments hereof proceeds.

BRIEF DESCRIPTION OF THE DRAWINGS

In the accompanying drawings, there are shown present preferred embodiments of the invention wherein like reference numerals are employed to designate like parts and wherein.

DETAILED DESCRIPTION OF PREFERRED EMBODIMENTS

Figure 1:
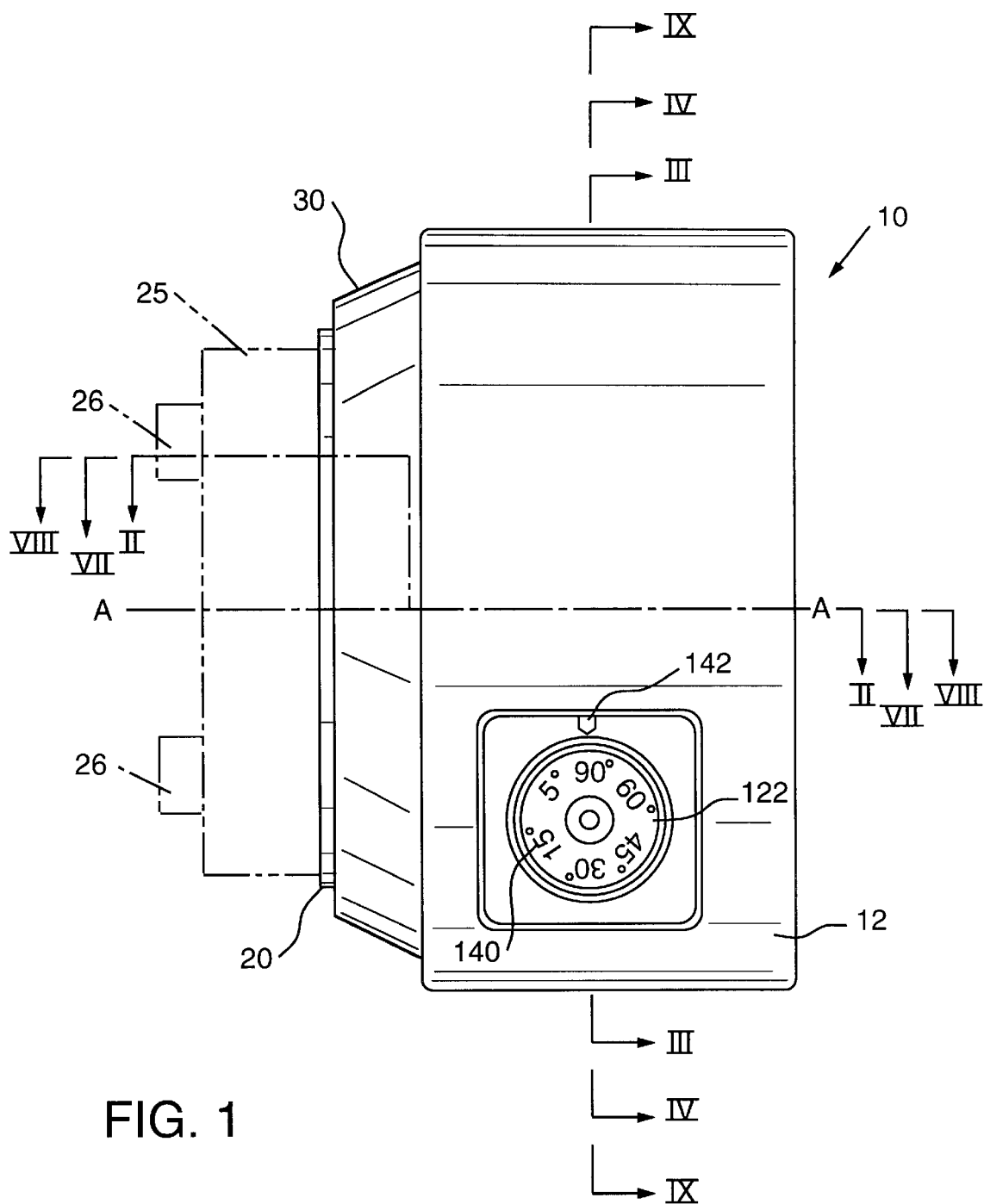
FIG. 1 is a side elevational view of an indexable apparatus of the present invention with a payload shown in phantom lines attached to the indexable support table thereof.

Referring now to the drawings for the purposes of illustrating present preferred embodiments of the invention only and not for purposes of limiting the same, the Figures illustrate an indexable apparatus 10 that has a housing 12 that can be operably attached to variety of different support structures (not shown) to orient the device's axis of rotation "A—A" (also referred to herein as the "the first axis" in a desired manner relative to, for example, the spindle of a machine tool. As the present Detailed Description of Preferred Embodiments proceeds, the reader will appreciate that the present indexable apparatus 10 may be used in a variety of different applications wherein it is desirable to index an item or a plurality of items about an axis at predetermined degrees of accuracy (i.e., approximately ±5 arc-seconds or other acceptable tolerances).

Figure 2:
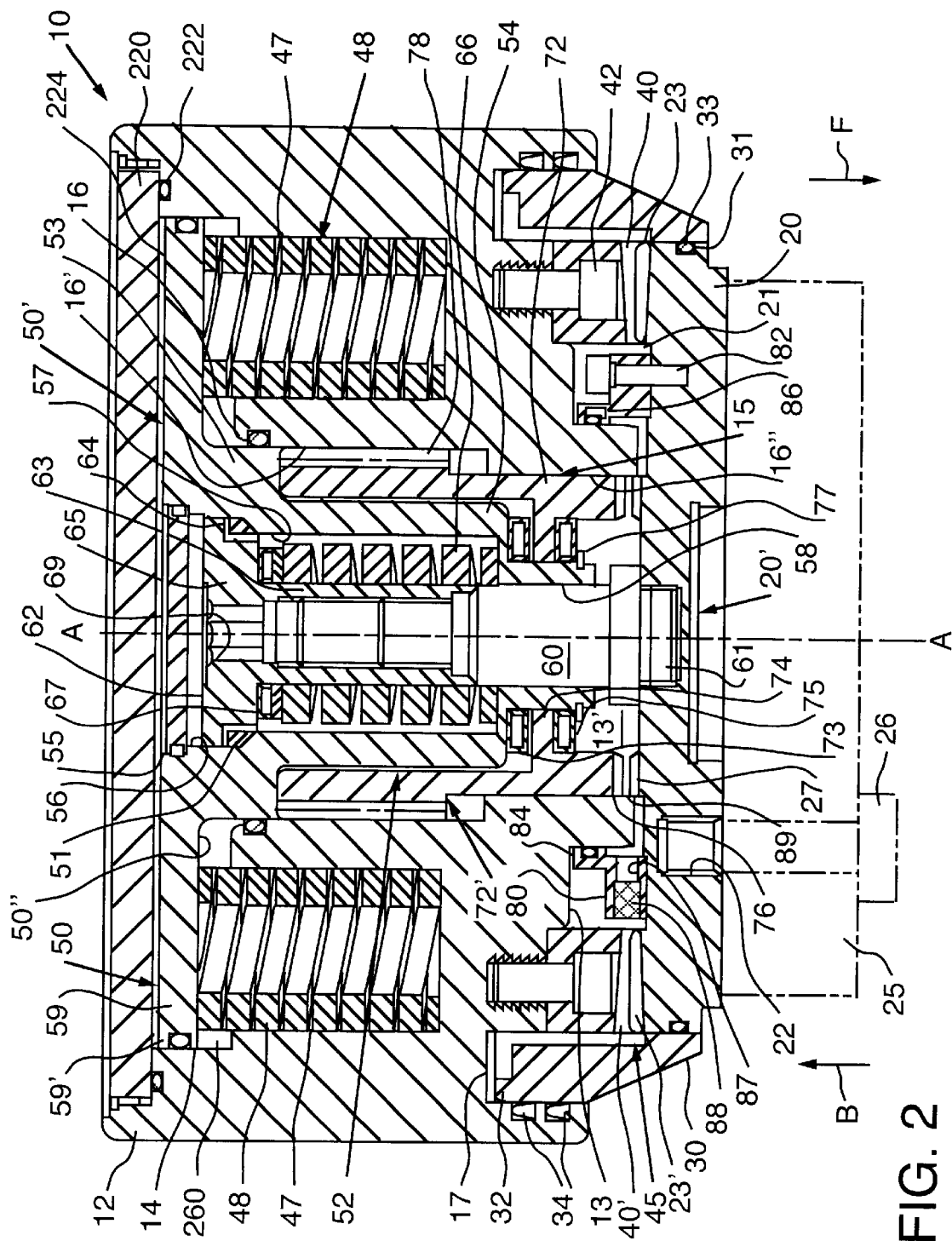
FIG. 2 is a cross-sectional plan view of the indexable apparatus of FIG. 1 taken along line II—II in FIG. 1.
Figure 3:
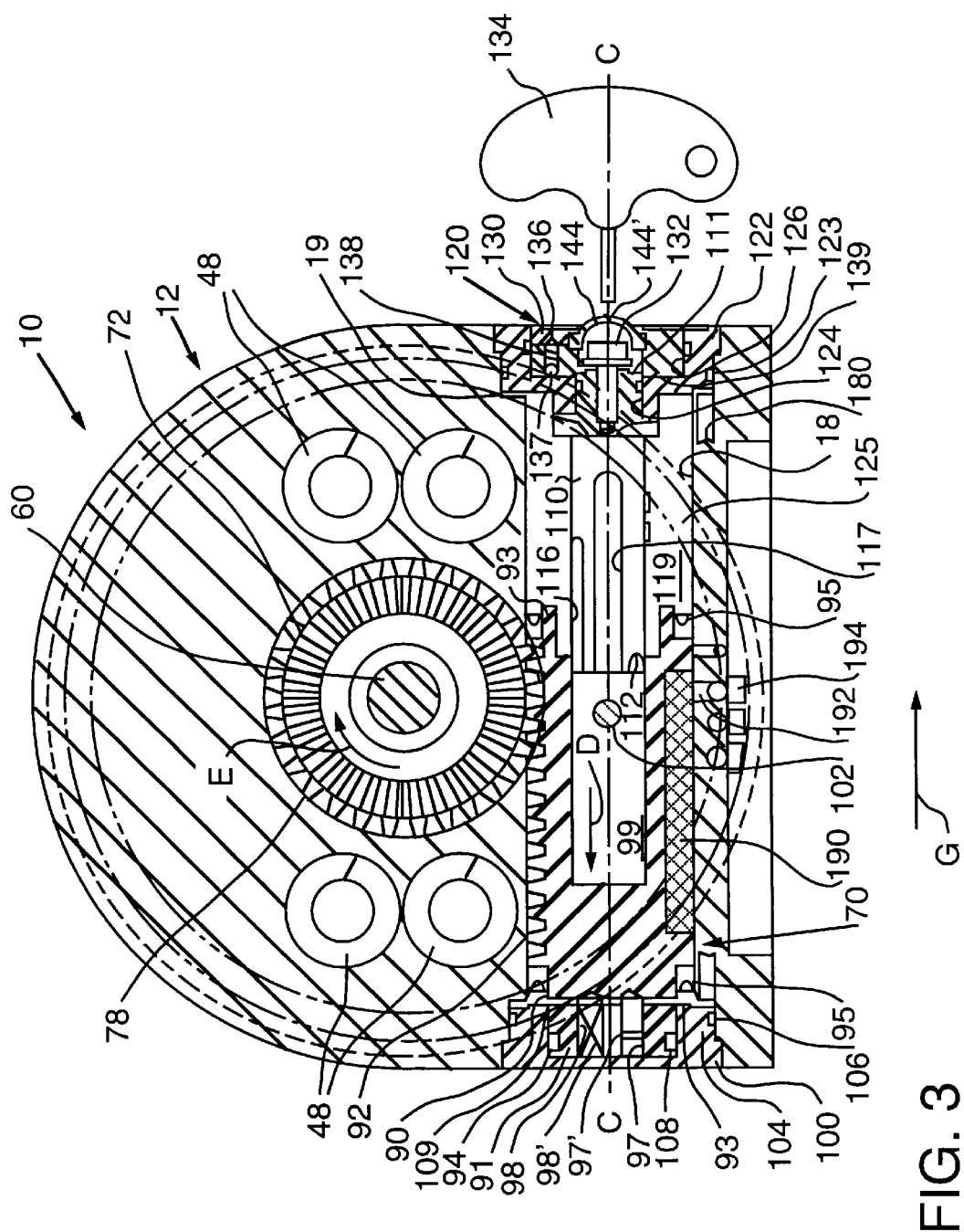
FIG. 3 is a cross-sectional elevational view of the indexable apparatus of FIGS. 1 and 2 taken along line III—III in FIG. 1 and further illustrating the use of a wrench for rotating the selector shaft thereof.

More particularly and with reference to FIGS. 1–3, the present indexable apparatus 10 includes an indexable support table 20 that is operably supported by the housing 12. The indexable support table 20 is axially and rotatably movable about first axis A—A by an indexing assembly generally designated as 15. A plurality of (preferably four) threaded bores 22 are provided in the indexable support table 20 for facilitating the attachment of a payload 25 thereto. See FIG. 2. The reader will appreciate that the payload 25 could comprise, for example, a single workpiece, a plurality of workpieces, and/or a variety of workholding devices such as vises, clamps, fixtures, etc. It will also become further apparent that, due to the unique and novel design of the subject invention, the payload can be mounted to the indexable support table 20 in a variety of different orientations, including being eccentrically mounted relative to the indexing axis, without risk of creating inadvertent slippage of the indexable support table during the indexing process. Such slippage could result in the mispositioning of the payload 25 relative to the machine tool spindle which could lead to inaccurate machining of the payload 25. As can be seen in FIGS. 1 and 2, payload 25 is preferably attached to the indexable support table 20 by cap screws 26. The skilled artisan will readily appreciate, however, that other means of attachment could be successfully employed to attach workpieces and/or workholding apparatuses to the indexable support table 20.

Figure 7:
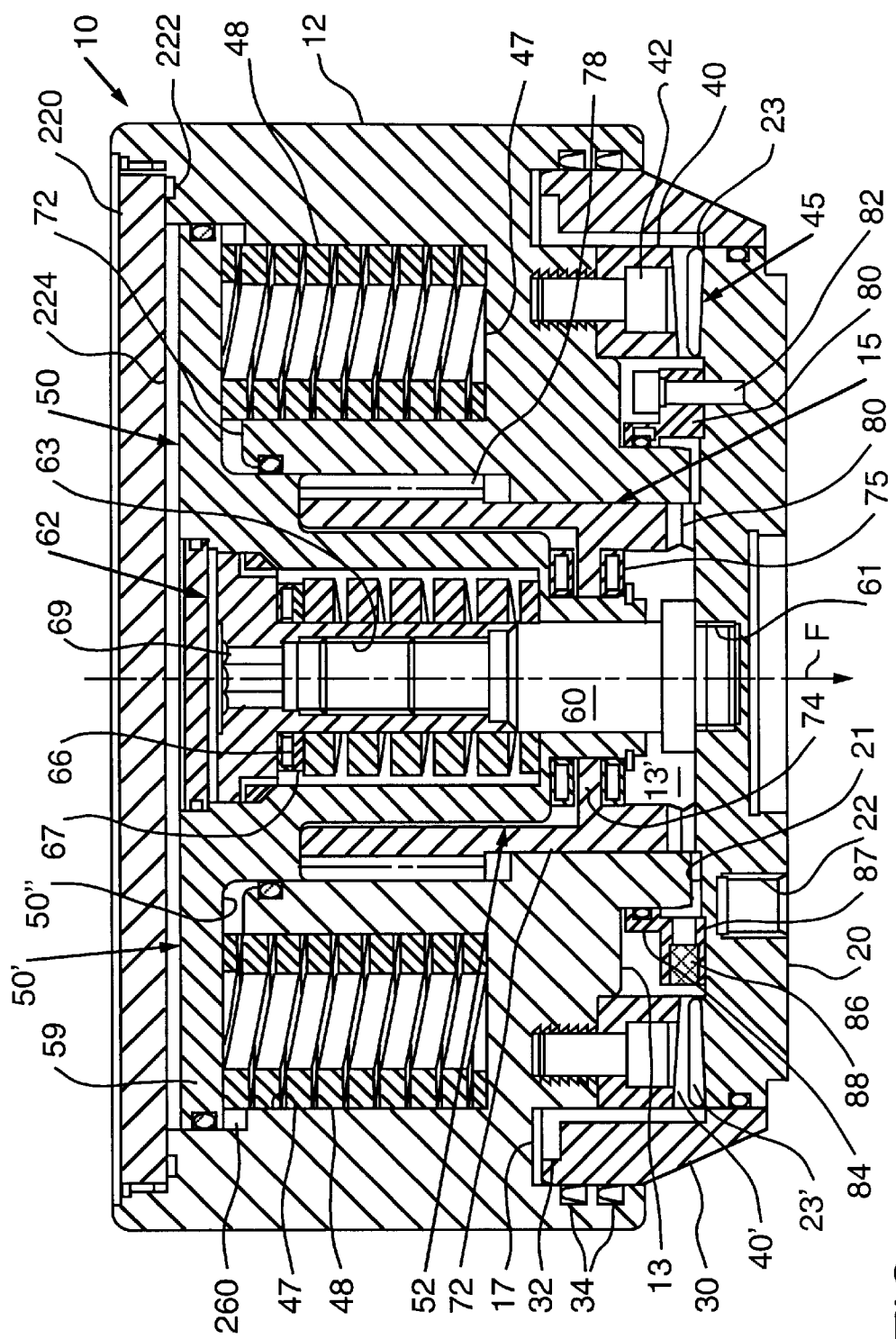
FIG. 7 is a partial cross-sectional plan view of the present indexable apparatus taken along line VII—VII in FIG. 1 with the first and second couplings thereof engaged.
Figure 8:
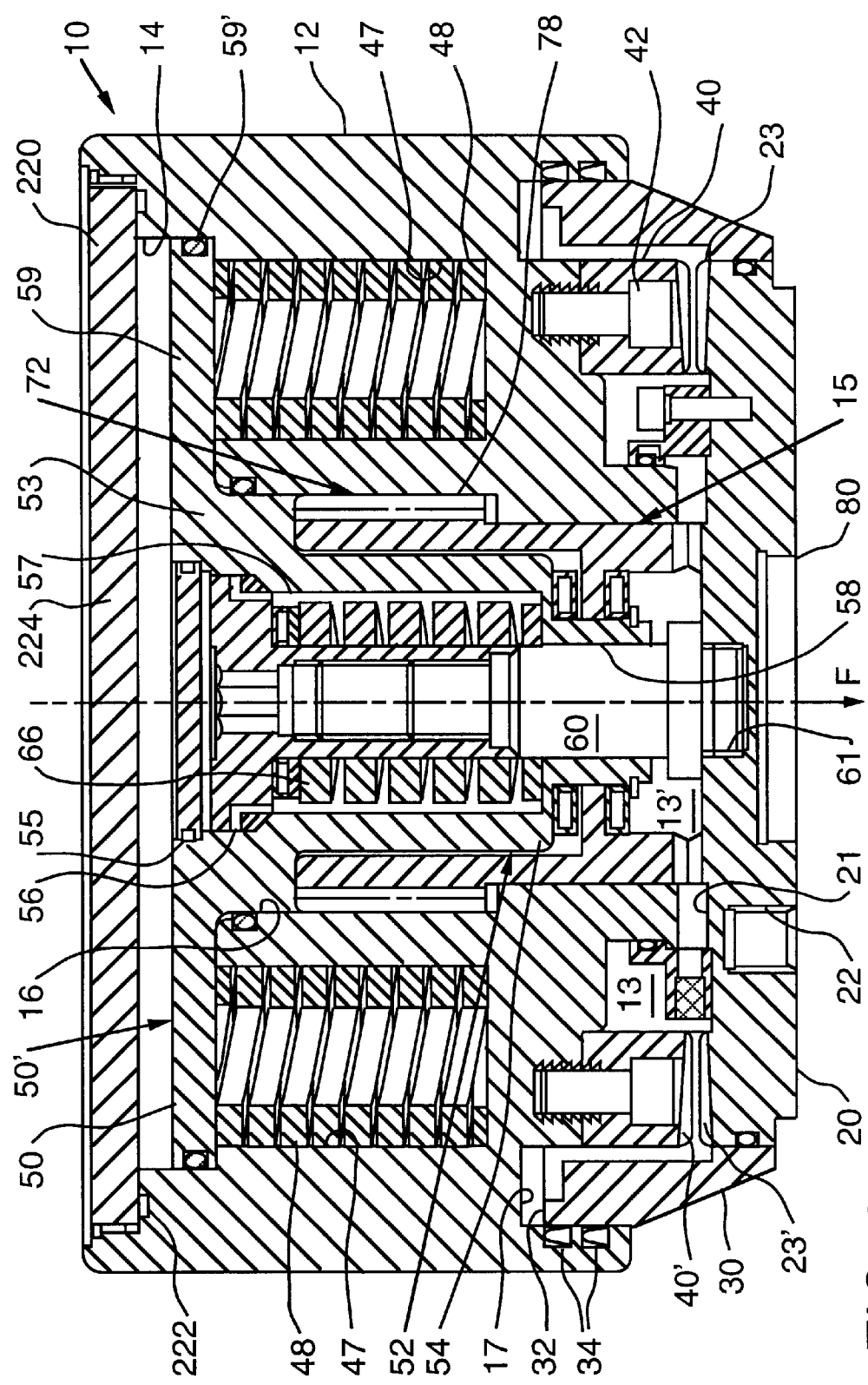
FIG. 8 is a cross-sectional plan view of the present indexable apparatus taken along line VIII—VIII in FIG. 1 with the first coupling thereof disengaged and the second coupling thereof engaged.

To provide an indication of the angular position of the indexable support table 20 about first axis "A—A", a scale ring 30, can be attached to the perimeter of the indexable support table 20 by an interference fit. To achieve a seal between the perimeter of the indexing table 20 and the scale ring 30 an O-ring 33 is received in a groove 31 that is provided around the perimeter of the indexing table 20. The scale ring 30 has an annular portion 32 that is adapted to be selectively received within an annular cavity 17 in the housing 12. See FIGS. 2 and 8. Numerical indicia (not shown) may be provided on the scale ring 30 and cooperate with a witness mark (not shown) on the housing 12 to provide the operator with a visual indication of the angular position of the indexable support table 20 and, ultimately, of the payload 25 that is attached thereto. At least one, and preferably two, commercially available wiper members 34 may be mounted in the wall of cavity 17 as shown in FIGS. 2, 7, and 8 to prevent chips and debris from entering into the mechanism of the indexer.

Figure 2A:
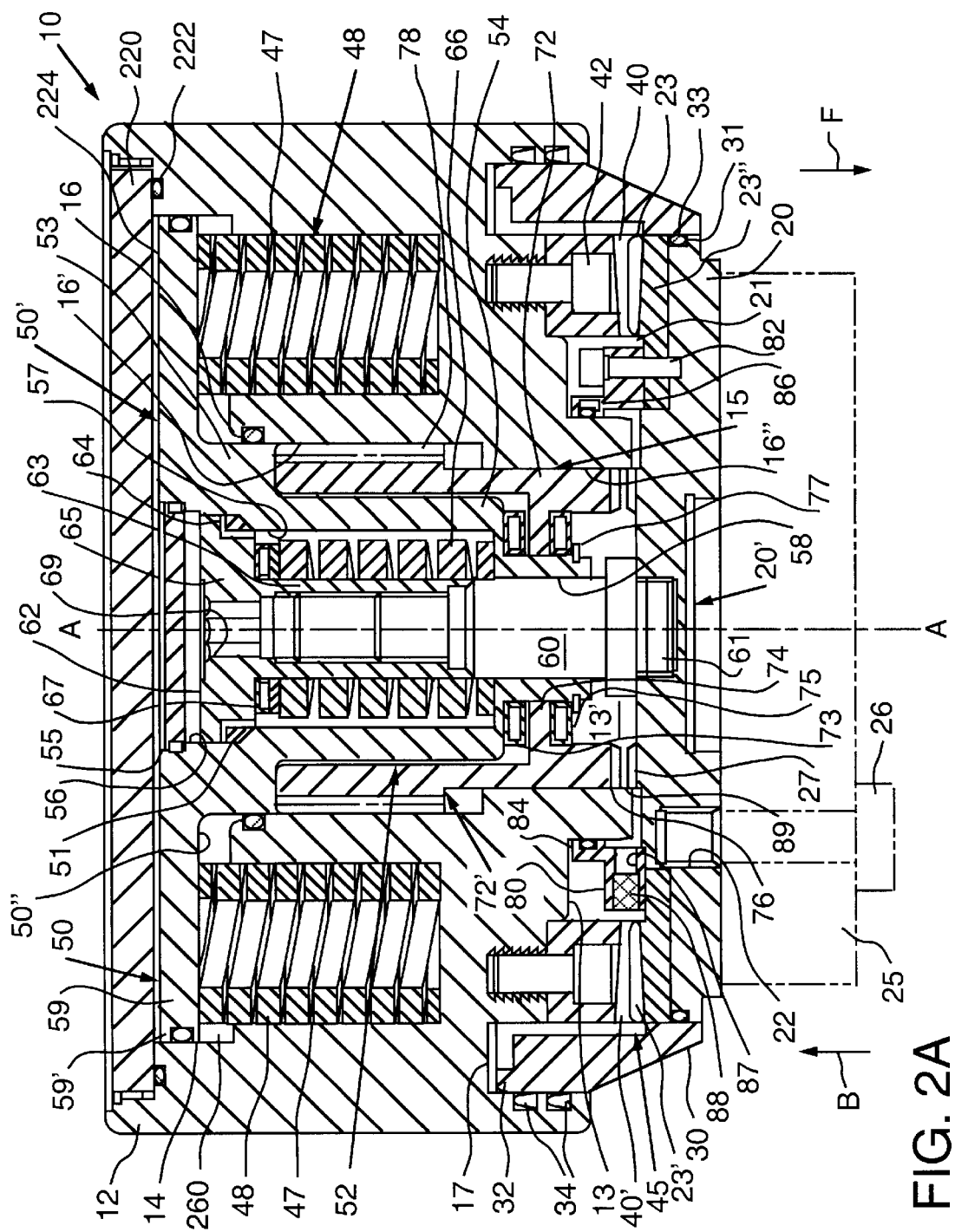
FIG. 2A is a cross-sectional view of another embodiment of the indexing apparatus taken in the same direction as FIG. 2.

As can be seen in FIG. 2, a "first" retainer 40, preferably in the form of a first ring of teeth 40', is attached to housing 12 by a plurality of cap screws 42. In the alternative, the teeth 40' of the first retainer 40 could be integrally formed in the housing 12. The teeth 40' of the first retainer 40 are adapted to selectively mesh with a "second" retainer 23 in the form of a second ring of teeth 23' formed in the underside 21 of the indexable support table 20. While FIG. 2 depicts teeth 23' of the second retainer 23 being formed in the underside 21 of the indexable support table 20, those of ordinary skill in the art will appreciate that such teeth 23' could also be formed on a ring that is removably attached to the underside 21 of the indexable support table 20 by, for example, a plurality of capscrews 82. See FIG. 2A. The second retainer 23' of indexable support table 20, in combination with the first retainer teeth 40', forms a first coupling generally designated as 45 that is known in the art as a "Curvic-type" or "Hirth-type" coupling. The second retainer 23 and the first retainer 40 may each contain a total of seventy-two teeth. However, other teeth configurations could be employed.

The present invention also includes a fluid-actuatable piston 50 that is coaxially supported within the housing 12 for selective axial movement along indexing axis A—A. Piston 50 has a hub portion 52 and an outwardly extending flange 59. Outwardly extending flange portion has a first outer side 50' and a second inner side 50" as shown in FIGS. 2, 7 and 8. Hub portion 52 further has two "stepped portions" or flanges (53, 54) formed on the outer surface thereof, the purpose of which will be discussed in further detail below. A series of coaxially aligned bores (55, 56, 57, 58) extend through the piston 50 through which an indexing shaft 60 coaxially extends. As can be seen in FIG. 2, the flanged portion 59 is sized to be coaxially received in axial bore 14 in the housing member 12. As can also be seen in FIGS. 2 and 8, the stepped portion 53 of the piston 50 is sized to be slidably received in a bore 16 in the housing 12 that is coaxially aligned on first axis A—A with bore 14. The flange 59 of the piston member 50 is preferably fitted with an O-ring 59' for establishing a substantially fluid-tight seal with the housing member 12 and thus forms a substantially fluid-tight "primary" chamber 260 between the inner side 50" of the flanged portion 59 and the housing 12. See FIG. 2. In this embodiment, at least one, and preferably four, "first biasing members", in the form of springs 48 in compression are provided in corresponding cavities 47 in the housing 12 for axially biasing the piston 50 in a "second axial direction" direction represented by arrow "B" in FIG. 2.

As can also be seen in FIG. 2, an indexing shaft 60 is affixed to the indexable support table 20 by a threaded connection designated by 61 and a shaft nut 62 is threaded onto the indexing shaft 60 by a threaded connection designated by 63. Shaft nut 62 may also have two flanged portions 64 and 65 as shown in FIG. 2. A "second biasing member" or "axial biasing member" in the form of an axial spring 66 in compression is installed within bore 57 in piston 50 for biasing the shaft nut 62 and the indexable support table 20 in the second axial direction represented by arrow "B" in FIG. 2. A commercially available thrust bearing 67 may be employed between the end of spring 66 and the flanged portion 64 of the shaft nut 62. In addition, the flange portion 64 of the shaft nut 62 may be supported within the piston 50 by a spherical bearing 51. To facilitate attachment of the shaft nut 62 to the indexing shaft 60, the shaft nut 62 is provided with a socket 69 adapted to receive a commercially available hexagonal wrench therein. In this embodiment, the piston 50, spherical bearing 51, and O-ring 59' comprise a piston assembly 50' and the indexing table 20, scale ring 30, O-ring 33, shaft 60, shaft nut 62, seal ring 80, capscrews 82, seal 86, and filter medium 88 comprise an indexable table assembly generally designated as 20'.

As shown in FIGS. 2 and 3, the indexable support table 20 is selectively axially displaced and rotated about axis A—A by the indexing assembly 15 which includes a rotator in the form of a rack and pinion drive assembly generally designated as 70 that operably drives an axial displacement member 72. In a preferred embodiment, axial displacement member 72 comprises a pinion gear 72' that is rotatably supported on the hub portion 52 of the piston 50 and the bores 16' and 16" in the housing 12. As can be seen in FIG. 2, pinion gear 72' may be provided with an inwardly extending flange 74 that is rotatably supported between a pair of commercially available thrust bearings (73, 75) to facilitate rotation of the pinion gear 72' with respect to the piston 50. To prevent the pinion gear 72' from moving axially with respect to the piston 50, a commercially available "snap" or retaining ring 77 is affixed to the end of the piston 50.

Pinion gear 72' also has a ring of "primary" retainer teeth 76 formed on one end and a series of gear teeth 78 formed around its perimeter, the purpose of which will be discussed in further detail below. Primary retainer teeth 76 are adapted to selectively engage a corresponding "secondary" ring of retainer teeth 27 formed on the underside 21 of the indexable support table 20. The skilled artisan will appreciate that the primary retainer teeth 76 of pinion gear 72' and the corresponding secondary retainer teeth 27 on the indexable support table 20 cooperate to form a second "Curvic-type" or "Hirth-type" coupling, generally designated as 89. See FIGS. 7 and 8.

To prevent dirt and debris from infiltrating between the underside 21 of the indexable support table 20 and the housing 12, a seal ring 80 may be employed. Seal ring 80 can be removably affixed to the underside 21 of the indexable support table 20 by capscrews 82 or other suitable means. Seal ring 80 has an inwardly protruding portion 84 that supports a commercially available seal 86 for establishing a slidable seal with the housing 12. In addition, to prevent air pressure differences between cavities 13 and 13' in the housing 12 during operation, a breather or exhaust passage 87 is provided through the seal ring 80. A filter medium 88, such as sintered bronze, may be provided in the breather passage 87 to prevent dirt/debris infiltration therein.

As can be seen in FIG. 3, rotator 70 also includes a slidable rack sleeve 90 that is adapted to mesh with the pinion gear 72'. In this embodiment, rack sleeve 90 is fluid-actuated. The rack sleeve 90 is slidably received in a bore 18 in housing 12. The axis C—C of bore 18 is substantially transverse to axis A—A. Rack sleeve 90 may be fabricated from acetal plastic and is adapted to axially slide in housing 12 along axis C—C. Rack sleeve 90 has teeth 92 machined along a portion of its perimeter that are adapted to engage the gear teeth 78 of pinion gear 72'. A wiper seal 95 may be provided in corresponding undercut areas 93 on each end of the rack sleeve 90 to establish substantially fluid-tight seals between those ends of the rack sleeve 90 and the wall of bore 18.

Figure 6:
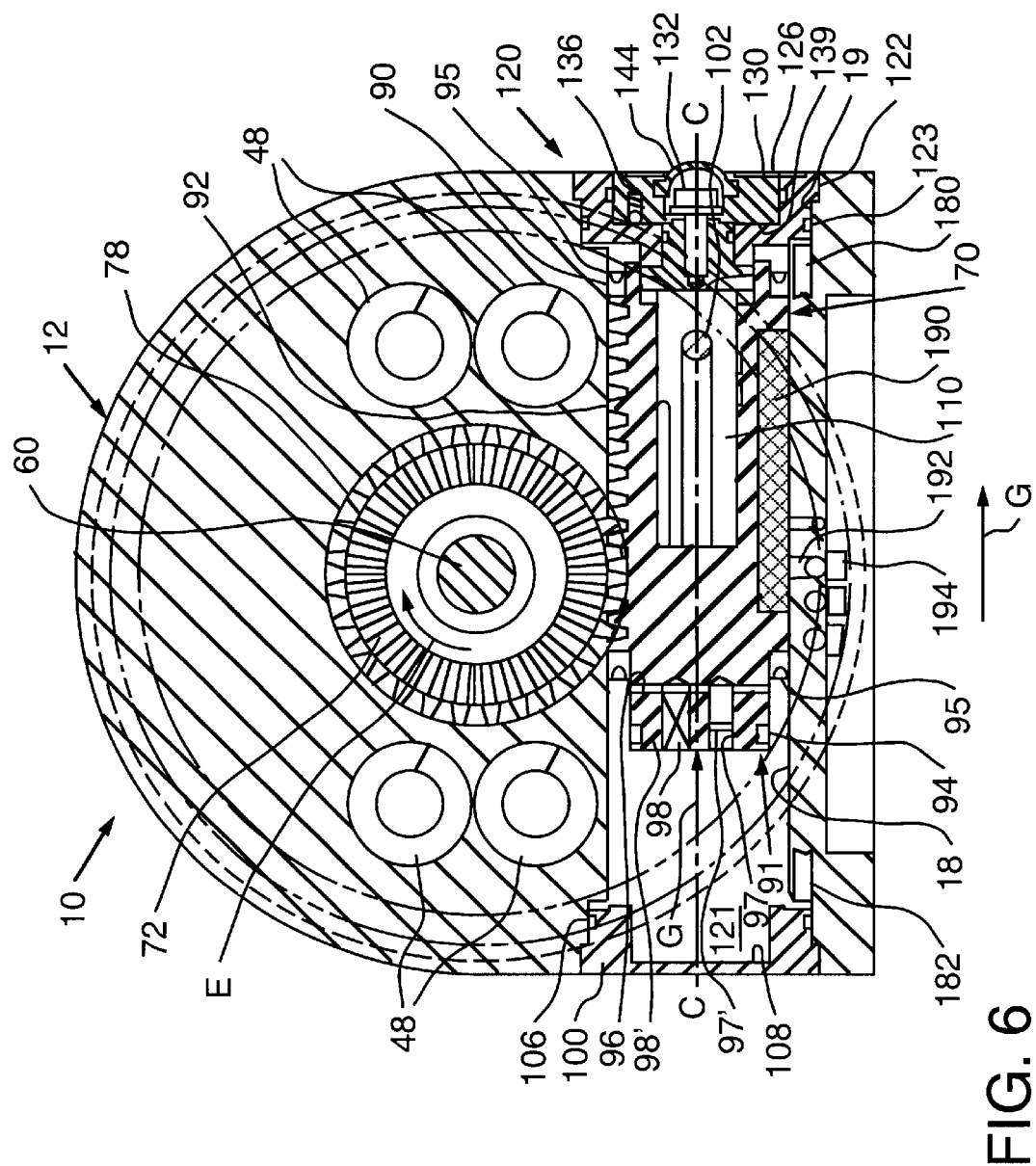
FIG. 6 is a partial cross-sectional side elevational view of the indexable apparatus of the present invention taken along line VI—VI in FIG. 1 with the rack pin thereof engaging an elongated slot in the selector shaft.
Figure 9:
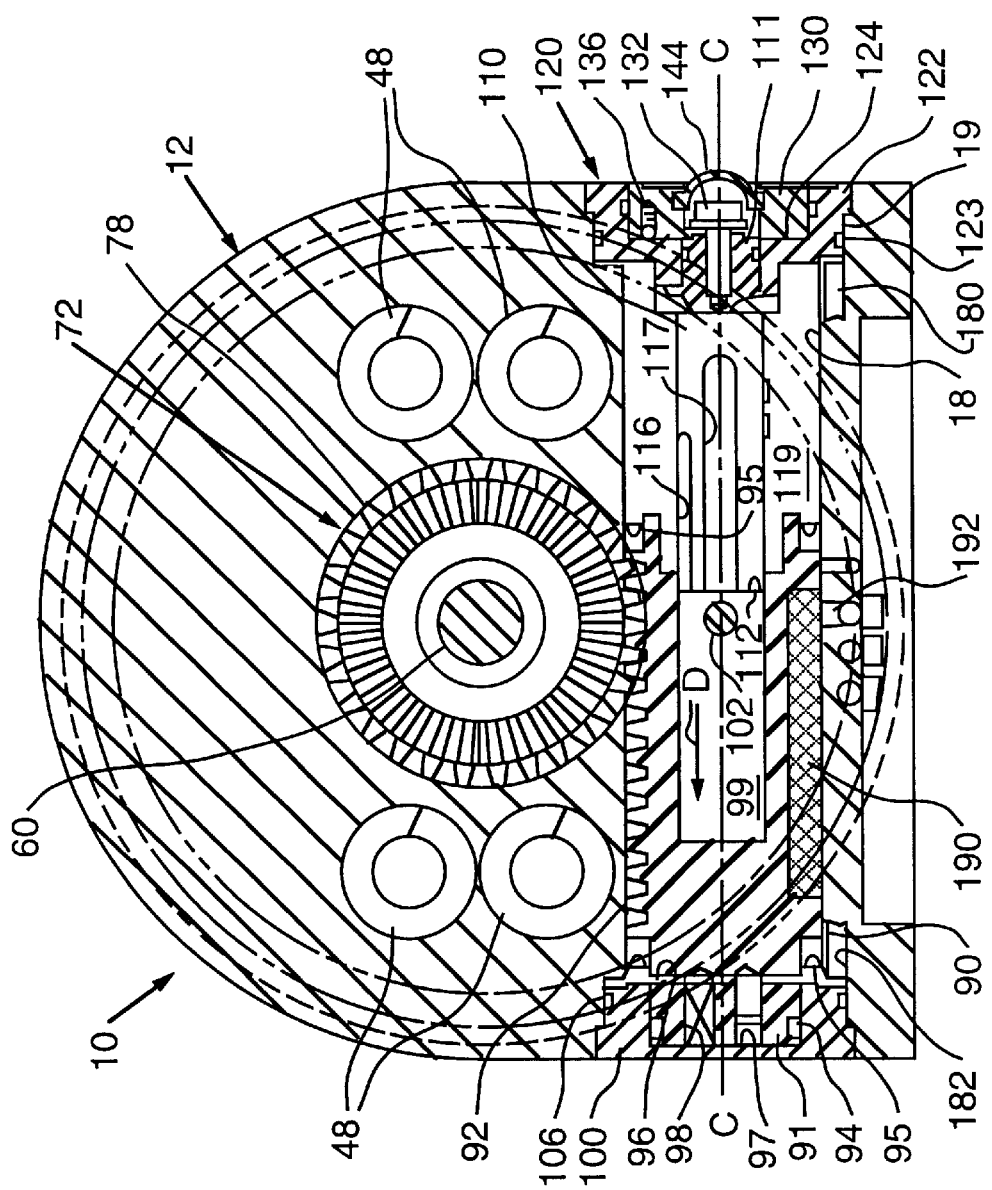
FIG. 9 is a cross-sectional elevational view of the present indexable apparatus taken along line IX—IX in FIG. 1 after the rack sleeve thereof has rotated the pinion gear a preselected distance.

As shown in FIG. 6, bore 18 in the housing 12 is sealed on one end by an end cap 100 that is attached to the housing 12 by, for example, cap screws (not shown) to establish a substantially fluid-tight secondary chamber 121 between housing 12 and the rack sleeve 90. To achieve a substantially fluid-tight seal between the end cap 100 and the housing 12, an O-ring 106 is provided in an annular groove 104 in the end cap 100. As can be seen in FIGS. 3 and 9, the end cap 100 is provided with a cavity 108 that is sized to receive an end portion 91 of the rack sleeve. To damp the travel of the rack sleeve 90 when the rack sleeve 90 encounters the end cap 100, the end portion 91 of the rack sleeve 90 may be configured to function as a shock absorber. In particular, the rack sleeve 90 may be provided with a seal 94 adapted to engage the wall of cavity 108. Cavity 108 is preferably provided with a chamfered portion 109 to assist with the entry of the seal 94 into the cavity 108. Those of ordinary skill in the art will appreciate that when the end portion 91 is received in the cavity 108 at the end of the axial stroke of the rack sleeve 90 (FIGS. 3 and 9), fluid is trapped under pressure between the end 91 of the rack sleeve 90 and the end cap 100. Thus, the axial travel of the rack sleeve 90 in the "D" direction can be further damped by controlling the exit of fluid from between those two components. Such trapped fluid may be permitted to exit through an orifice 97' in a passage 96' provided in end portion 91 that communicates with a transverse exhaust passage 96. Thus, when the rack sleeve 90 slides in the "D" direction within bore 18 and its end portion 91 is received in cavity 108 in the end cap 100, the fluid that is trapped between the end portion 91 and the end cap 100 is permitted to pass through passage 97 and exhaust passage 96 at a rate controlled by orifice 97' to reduce the rate of travel of the rack sleeve 90. In addition, a check valve 98' is provided in another passage 98 provided in the end portion 91. The check valve 98' prevents pressurized fluid from passing through the passage 98 when the pressure is higher in the cavity 108 than in chamber 121 (i.e., during the damping action described above), but permits free flow of fluid when the pressure is higher in the secondary chamber 121 than in the cavity 108 (i.e., when pressurized fluid is admitted to the secondary chamber 121 to move the rack sleeve 90 in direction "G").

Figure 4:
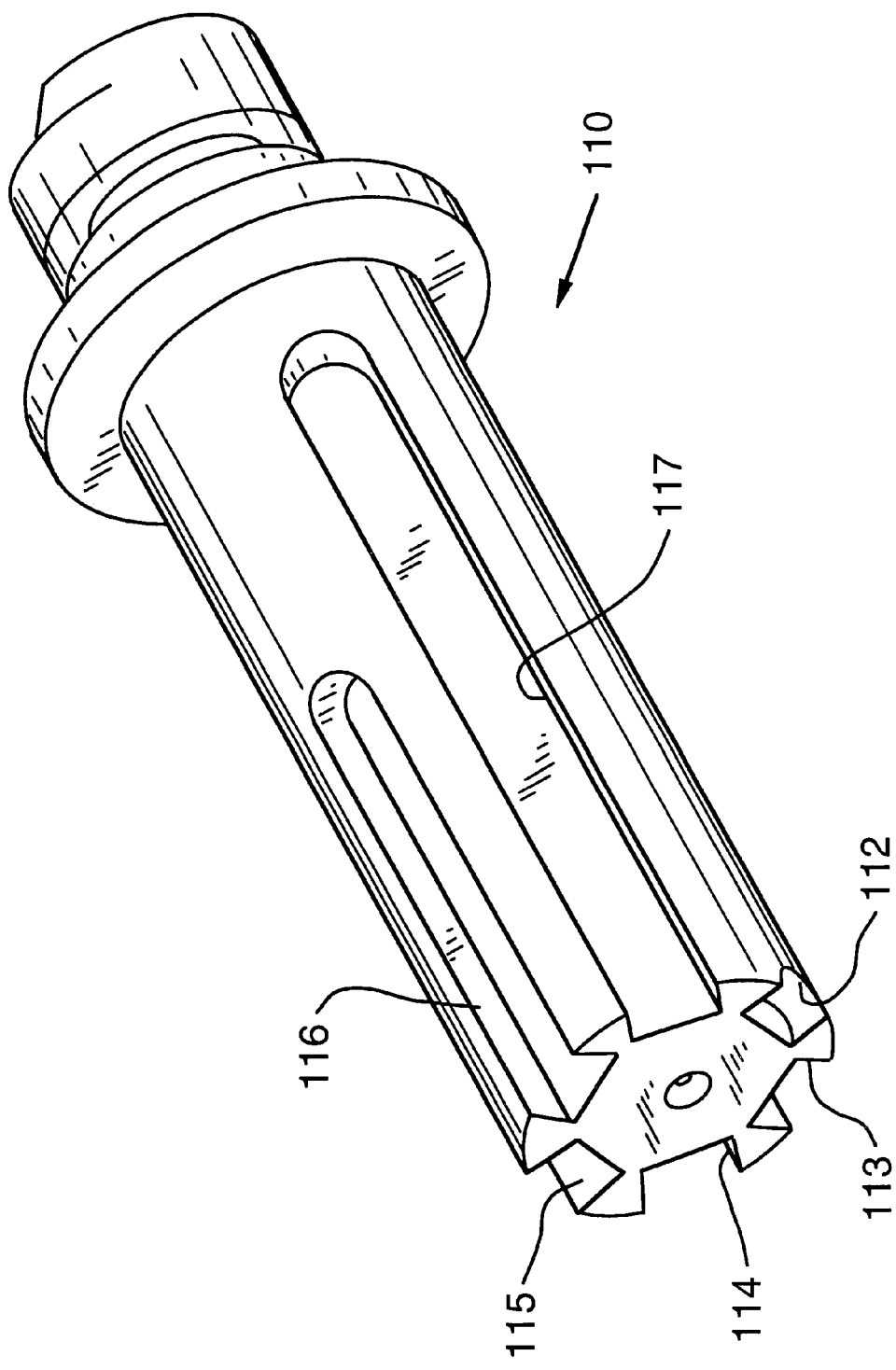
FIG. 4 is an end perspective view of a selector shaft of the present invention.

Rack sleeve 90 is also provided with an axial bore 99 (FIGS. 3 and 9) that is sized to slidably and rotatably receive a selector shaft 110 therein. Selector shaft 110 may be fabricated from aluminum and is rotatably actuatable by a disc assembly 120. A plurality of axial grooves (112, 113, 114, 115, 116, 117) are machined into the shaft 110 at different positions for engagement with a transverse "stop member" in the form of a pin 102 mounted in the wall of the rack sleeve 90. See FIGS. 3 and 4. Preferably, pin 102 is fabricated from hardened steel and protrudes inwardly into the axial bore 99 in the rack sleeve 90 to selectively engage the axial grooves (112, 113, 114, 115, 116, 117) in the selector shaft 110. As will be discussed in further detail below, the axial grooves (112, 113, 114, 115, 116, 117) serve to define a plurality of beginning positions for the rack sleeve 90. By axially moving the rack sleeve from any of the beginning positions to an ending position, a rotational force is applied to the pinion gear 72 (represented by arrow "E" in FIG. 6). For example, if the selector shaft 110 is rotated such that the axial groove 112 defines the beginning position, the rack sleeve 90 will, when actuated in the manner discussed below, travel in the "G" direction until pin 102 engages the axial groove 112. During this travel, the pinion gear 72' rotates but the indexable table assembly 20' does not rotate because coupling 89 is disengaged and coupling 45 is engaged. A stroke in the direction of the arrow "D" then causes the table assembly 20' to rotate a predetermined amount. In a preferred embodiment, such axial travel of the rack sleeve 90 will ultimately result in the 5° rotation of indexable support table 20 about axis A—A. When the selector shaft 110 is rotated such that pin 102 is received in axial groove 113, the indexable support table will, upon actuation of the rack sleeve 90, rotate 15°. Similarly, when pin 102 is received in axial groove 114, the indexable support table 20 will rotate 30° upon actuation of the rack sleeve 90. When pin 102 is received in axial groove 115, the indexable support table 20 will rotate 45° upon actuation of the rack sleeve 90. Likewise, when pin 102 is received in the axial groove 116, the indexable support table 20 will rotate 60° upon actuation of the rack sleeve 90. When the pin 102 is received in axial groove 117, the indexable support table 20 will rotate 90° when the rack sleeve 90 is axially actuated.

Selector shaft 110 is rotatably supported in the housing 12 by a disc assembly 120. As can be seen in FIGS. 3, 6, and 9, disc assembly 120 preferably comprises a first support cap 122 that is fastened to housing 12 by, for example, capscrews (not shown). Support cap 122 is sized to be received in a counterbore 19 that is coaxially aligned with bore 18 and, to establish a substantially fluid-tight seal between the support cap 122 and the wall of counterbore 19, an O-ring 123 is provided in support cap 122. Support cap 122 also has an axial bore 124 extending therethrough that is adapted to rotatably receive and support an end 111 of selector shaft 110. Those of ordinary skill in the art will appreciate that end cap 100 and support cap 112 serve to seal both ends of bore 18 to form a substantially fluid-tight "second" chamber 119 and a "secondary" chamber 121 in housing 12.

Support cap 122 also preferably has a counterbore 126 therein that is coaxially aligned with the bore 124 and is sized to receive a portion of an actuator disc 130 that is attached to the shaft end 111 in a predetermined position. Actuator disc 130 is preferably attached to the end 111 of the shaft 110 by a capscrew 132 in the manner shown in FIGS. 3, 6, and 9; however, other fastening methods may also be used. As can be seen in FIG. 3, the selector shaft 110 may be selectively rotated by inserting a commercially available wrench 134 into the cap screw 132 and applying a desired amount of rotational force thereto. Cap screw 132 may be prevented from inadvertently backing out of the end 111 of the selector shaft 110 by securing it with a commercially available thread locking adhesive. Also, to assist the user in rotating the selector shaft 110 to one of the settings (i.e., 5°, 15°, 30°, 45°, 60° or 90°), at least one (and preferably three) spring-biased ball plunger 136 is mounted in the actuator disc 130. The skilled artisan will understand that the spring-biased ball plunger 136 comprises a ball member 137 and a spring 138. A series of dimples 139 that correspond to each of the rotational settings (i.e., 5°, 15°, 30°, 45°, 60° or 90°) are provided in the bottom of counterbore 126 in support cap 122. See FIGS. 3 and 6. Thus, when the user rotates the cap screw 132 in a clockwise direction, the ball 137 in the spring-biased plunger 136 will be biased into a dimple 139 when the actuator disc 130 has been rotated to that position. Such arrangement provides a detent when the proper rotational orientation has been achieved. In addition, numerical indicia 140 corresponding to each rotational setting are printed on the actuator disc 130 that is adapted to cooperate with a witness mark 142 on the support cap 122 for assisting the user in establishing the desired rotational setting. See FIG. 1. Also, to prevent the infiltration of dirt, chips, etc. around capscrew 132, a commercially available dust cap 144 is snapped into the counterbore in the actuator disc 130. Dust cap 144 has a piercable opening 144' therein through which the wrench 134 or other compatible adjustment tool may enter.

As shown in FIG. 2, to establish a substantially fluid-tight first chamber 224 on side 50' of piston 50, a cover plate 220 is threadably attached to housing 12. An O-ring 222 is mounted within a corresponding groove in housing 12 to establish a seal between the cover plate 220 and the housing 12.

Figure 5:
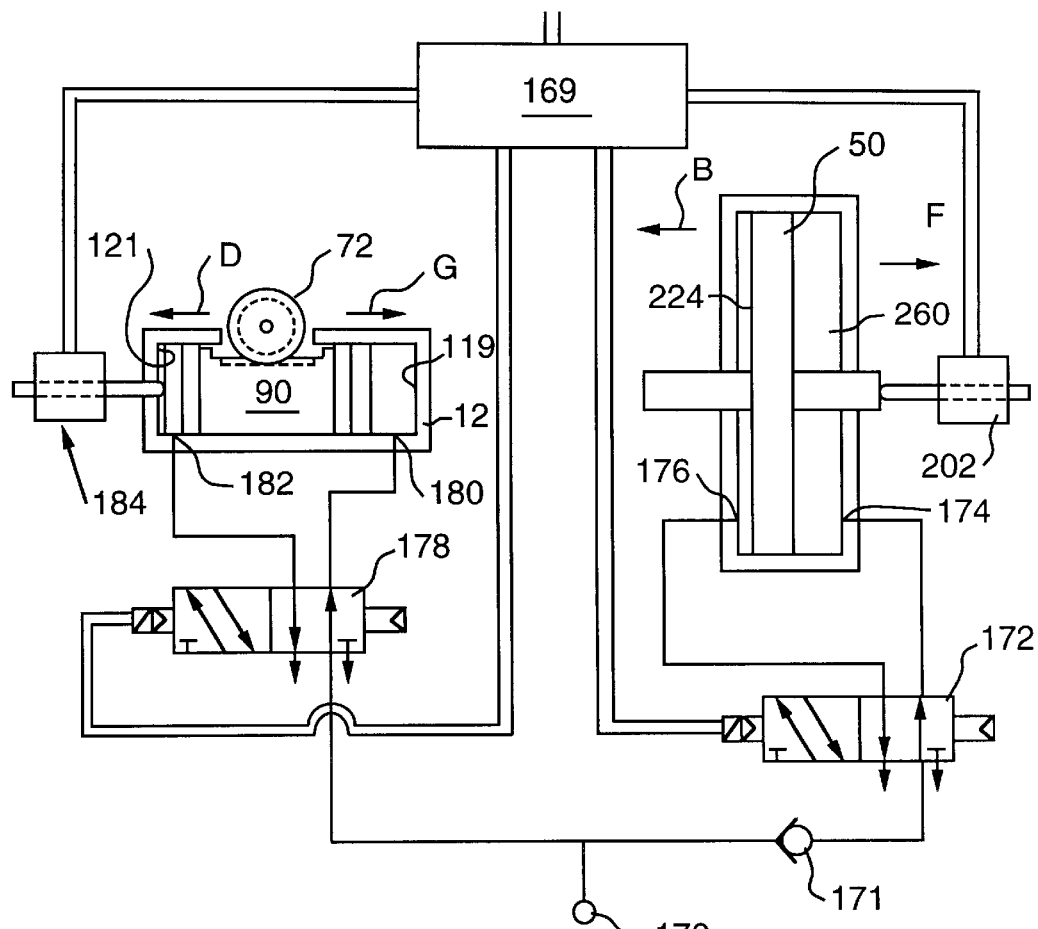
FIG. 5 is a schematic depiction of a control system for controlling the indexable apparatus of the present invention.

The present indexing apparatus may be pneumatically operated. FIG. 5 is a schematic depiction of a pneumatic control system for controlling the operation of the indexing apparatus 10. However, as will be appreciated by those of ordinary skill in the art, the present indexing apparatus 10 could also be operated by other mediums such as, for example, hydraulic fluid. In this embodiment, the control system is preferably controlled by a controller 169 that could interface in a known manner with the controller of a machine tool. An electronic controller of the type manufactured by Aromat Corporation of New Providence, N.J. under Model No. FPO-C14RS may be successfully employed. However, other controllers and control systems could also be used.

In a preferred embodiment, pressurized fluid (i.e., air preferably at 7 bar [100 psi]) is supplied to the indexing apparatus 10 from a supply of pressurized fluid, generally designated as 170. As can be seen in FIG. 5, the pressurized fluid is supplied from the supply 170 to a first control valve 172 which is connected to ports (174, 176) in the housing 12 and a second control valve 178 which is connected to ports (180, 182) in housing 12. Valves (172, 178) may be electrically controlled by controller 169. Electrically actuated control valves of the type fabricated by SMC Corporation of Tokyo, Japan under Model No. SY3140 may be used. However, other valves could also be successfully employed. To prevent undesirable back flow of pressurized fluid from valve 172 to the supply 170, a commercially available check valve 171 may be installed in the pipeline that connects the supply 170 to the valve 172.

The "first state" shown in FIGS. 2, 3, and 5 represents a preferred end point for an indexing cycle and start point for the next indexing cycle. In this state, first control valve 172 admits a primary amount of pressurized fluid through port 174 to primary chamber 260 and exhausts fluid through port 176 from first chamber 224, biasing piston 50 in the second axial direction represented by arrow B and thus engaging first coupling 45 to lock indexable support table 20 in position, and disengaging second coupling 89 so pinion gear 72 can be rotated without rotating the indexable support table 20. Piston assembly 50' exerts an axial force through the spherical bearing 51, shaft nut 62, and indexing shaft 60 to lock the table assembly 20'. The axial force equals the force exerted on the piston 50 by the pressurized fluid in the primary chamber 260 (in this example, approximately 12,000 Newtons) plus the force exerted on the piston 50 by the springs 48 (in this example, approximately 6,000 Newtons). Also in this state, second control valve 178 admits a second amount of pressurized fluid through port 180 to second chamber 119 and exhausts fluid through port 182 from secondary chamber 121, biasing rack sleeve 90 in direction of arrow D until rack sleeve 90 stops against end cap 100 ("end position" of rack sleeve 90); when the rack sleeve 90 is in this position, pin 102 is disengaged from all of the axial grooves (112, 113, 114, 115, 116, and 117) in the selector shaft 110 and the selector shaft 110 can therefore be rotated by the operator to change the index angle (5°, 15°, 30°, 45°, 60°, or 90° in a preferred embodiment). Sensors 202 and 184 may be provided to inform controller 169 that the indexer is in this first state. Starting from this state, there are four steps in an index cycle:

Step 1. Second control valve 178 shifts, admitting a secondary amount of pressurized fluid to secondary chamber 121 and exhausting fluid from second chamber 119, thus moving rack sleeve 90 in direction of arrow G until pin 102 stops against the end of the one of the axial grooves (112, 113, 114, 115, 116, and 117) in the selector shaft 110 that has been preselected by the operator. This position of the rack sleeve 90, shown in FIG. 6, is its "beginning position", and a plurality of beginning positions are available because the axial grooves (112, 113, 114, 115, 116 and 117) in the selector shaft 110 vary in length. This motion of the rack sleeve 90 rotates the pinion gear 72' but does not rotate the indexable support table 20 because the second coupling 89 is not engaged, and because the first coupling 45 is engaged. One or more sensors 184 may be provided to inform the controller 169 that this step is complete.

Step 2. First control valve 172 shifts, admitting a first amount of pressurized fluid to first chamber 224 and exhausting fluid from primary chamber 260, thus biasing piston assembly 50' and pinion gear 72' in the "first" axial direction represented by arrow F in FIG. 8. When the piston assembly 50' has moved a predetermined distance such as approximately 2.5 millimeters, first coupling 45 and second coupling 89 are both fully engaged, as shown in FIG. 7. During this motion, first coupling 45 is kept firmly engaged by an axial force of approximately 7500 Newtons exerted by spring 66. As a further first amount of pressurized fluid is admitted to first chamber 224, the piston assembly 50' and pinion gear 72' continue to move in the first axial direction of arrow F, and indexable table assembly 20' now moves with them. When these members have moved another distance, such as approximately 3.5 millimeters, the piston assembly 50' stops against the end of primary chamber 260 and the first coupling 45 is fully disengaged, while the second coupling 89 is kept firmly engaged by an axial force of approximately 7500 Newtons (or other acceptable amounts of force) exerted by axial spring 66. This state is shown in FIG. 8. One or more sensors 202 may be provided to inform the controller 169 that this step is complete.

Step 3. Second control valve 178 shifts back to the position shown in FIG. 5, admitting a second amount of pressurized fluid to second chamber 119 and exhausting fluid from secondary chamber 121, thus moving rack sleeve 90 in direction of arrow D until it reaches the end position shown in FIG. 3 with the end of the rack sleeve 90 against end cap 100. During this motion, the rack sleeve 90 rotates pinion gear 72', which in turn rotates the indexable support table 20 because the first coupling 45 is disengaged and the second coupling 89 is engaged as described in Step 2 above. One or more sensors 184 may be provided to inform controller 169 that this step is complete.

Step 4. First control valve 172 shifts back to the position shown in FIG. 5, admitting a primary amount of pressurized fluid to primary chamber 260 and exhausting fluid from first chamber 224, thus moving the piston 50 and pinion gear 72 in direction of arrow B. This motion reverses the actions described in Step 2. That is, the indexable support table assembly 20' moves with the piston 50 and pinion gear 72' for approximately 3.5 millimeters in direction of arrow B until the first coupling 45 is fully engaged, spring 66 maintaining firm engagement of second coupling 89 throughout this 3.5 millimeter motion. Piston 50 and pinion gear 72' continue to move in direction of arrow B for another distance, such as approximately 2.5 millimeters until piston 50 stops against spherical bearing 51 and shaft nut 62; at this point second coupling 89 is completely disengaged, all members have returned to the "first state" described before Step 1 above, and the index cycle is complete. The skilled artisan will readily appreciate that when the coupling 89 is initially engaged, and disengaged the first coupling 45 is also engaged. Such advantageous arrangement eliminates the possibility of the coupling 45 slipping during the indexing process, for example under the influence of a torque applied to the indexable support table 20 by an eccentrically mounted payload.

To enable the user to select the amount of rotational travel of the indexable support table 20 through rotation of the selector shaft 110, the rack sleeve 90 must be positioned in the "ending" position as shown in FIG. 3. The skilled artisan will appreciate that when the rack sleeve 90 is in the ending position, the selector shaft 110 can be rotated to the desired rotational position (i.e., the desired axial groove 112, 113, 114, 115, 116, or 117 is aligned with the pin 102). See FIG. 5.

To provide the controller 169 with an indication of the position of the rack sleeve 90 for control purposes, a first linear transducer or "indicator" assembly, generally designated as 184, may be employed. As can be seen in FIGS. 3, 6 and 9, indicator assembly 184 includes a magnet 190 that is affixed to the rack sleeve 90 for slidable travel therewith. Magnet 190 may be attached to the rack sleeve 90 by, for example, epoxy adhesive. Also mounted within the housing 12 is a magnetic conductor member 192 and a "first" magnetic sensor 194 that is oriented relative to the conductor member 192 to sense the position of the magnet 190 and send an appropriate signal to the controller 169. The skilled artisan will appreciate that when the rack sleeve 90 is axially moving along axis C—C, the change in the magnetic field caused by the magnet 190 is communicated to the control module 169 through the magnetic conductor member 192 into the magnetic sensor 194. For example, when the rack sleeve 90 moves in direction represented by arrow "G" in FIG. 3 to one of the plurality of rack beginning positions, the sensor 194 then generates an appropriate signal for the selected rack beginning position and communicates it to the controller 169. The controller 169 may employ that signal to notify the operator (i.e., by virtue of an indicator light or sound generating device) and/or to control the machine tool in an appropriate manner. Sensor 194 may comprise a commercially available "Hall-effect" device. However, other sensor arrangements could be successfully employed.

Figure 10:
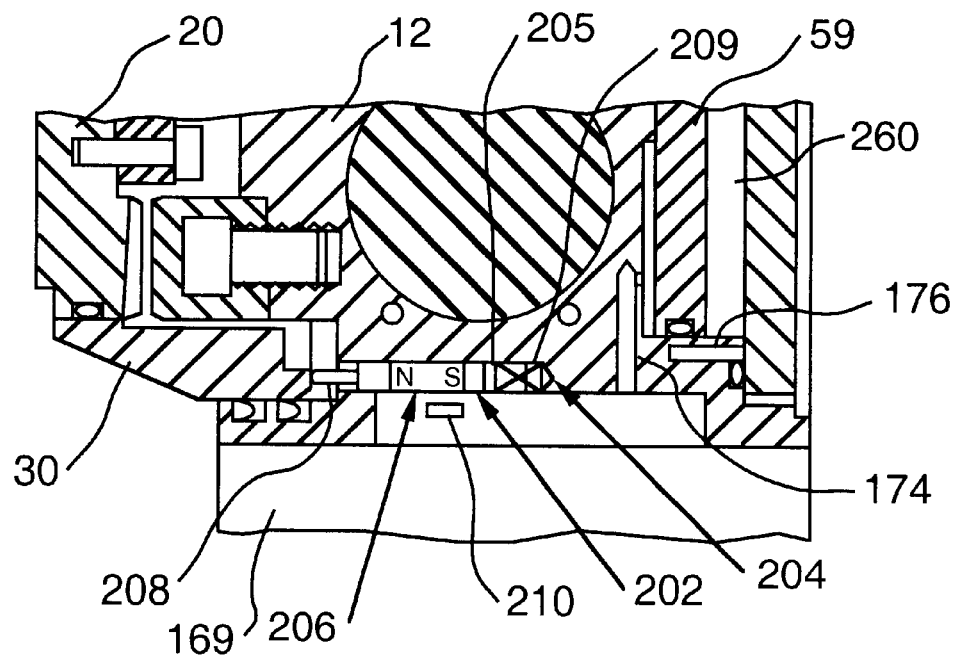
FIG. 10 is a partial cross-sectional view of the indexable apparatus of the present invention with the indexable support table in an unlocked position.
Figure 11:
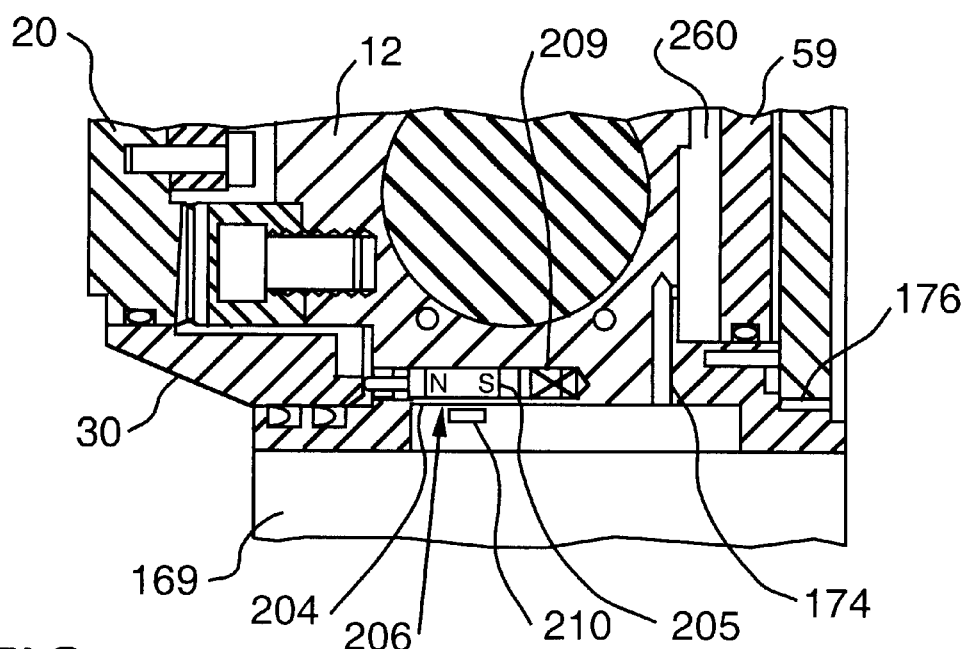
FIG. 11 is another partial cross-sectional view of a portion of the indexable apparatus of the present invention with the indexable support table in a locked position.

To determine when the indexable support table 20 is in a locked position (i.e., when the first retainer 40 is engaged with the second retainer 23) a "detector" or linear transducer arrangement 202 may be employed. As can be seen in FIGS. 10 and 11, the detector assembly 202 comprises a slide assembly 204 that is slidably mounted within the housing 12. Slide assembly 204 comprises a magnet member 206 that is slidably supported within a bore 205. Magnet member 206 includes an outwardly protruding actuator portion 208 that protrudes from the bore 205 towards the scale ring 30. Magnet member 206 is biased outwardly from the bore 205 by a spring 209 to orient the actuator portion 208 to be contacted by the scale ring 30 when the indexable support table 20 is in any one of the locked positions. See FIG. 11. Detector assembly 202 further includes a second magnetic sensor 210 that is mounted within the housing 12 adjacent the slide assembly 204 to sense the position of the magnet member 206. Thus, when the indexable support table 20 is in a locked position, the magnet member 206 is in a position wherein it can be sensed by the second magnetic sensor 210 which sends a useable signal to the controller 169. The controller 169 can then generate an indication signal by energizing a light or audible sound generating device and/or utilize that information to control a machine tool or other piece(s) of ancillary equipment.

Figure 12:
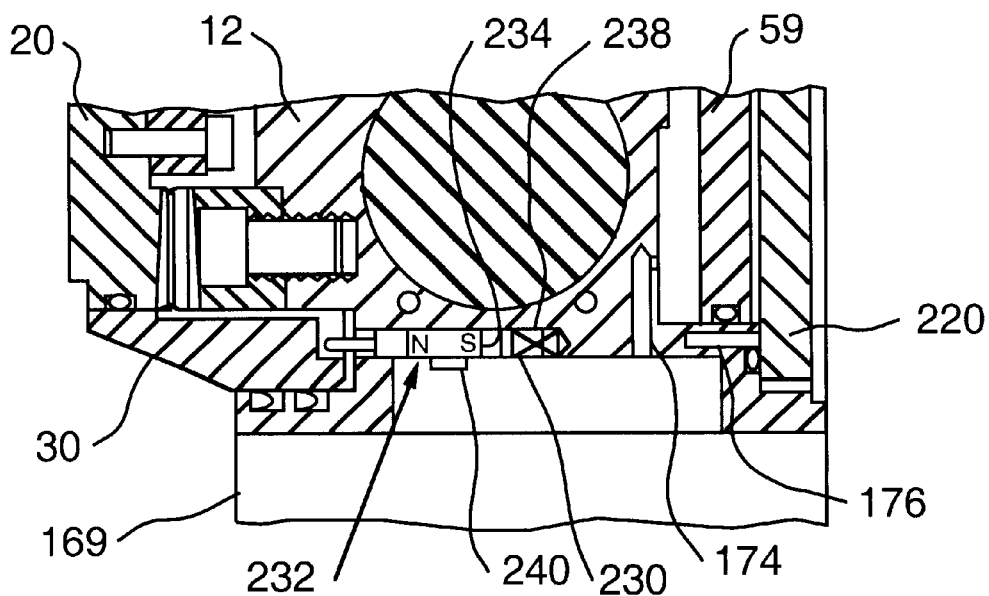
FIG. 12 is another partial cross-sectional view of a portion of the indexable apparatus of the present invention with the slide assembly thereof in a first position.
Figure 13:
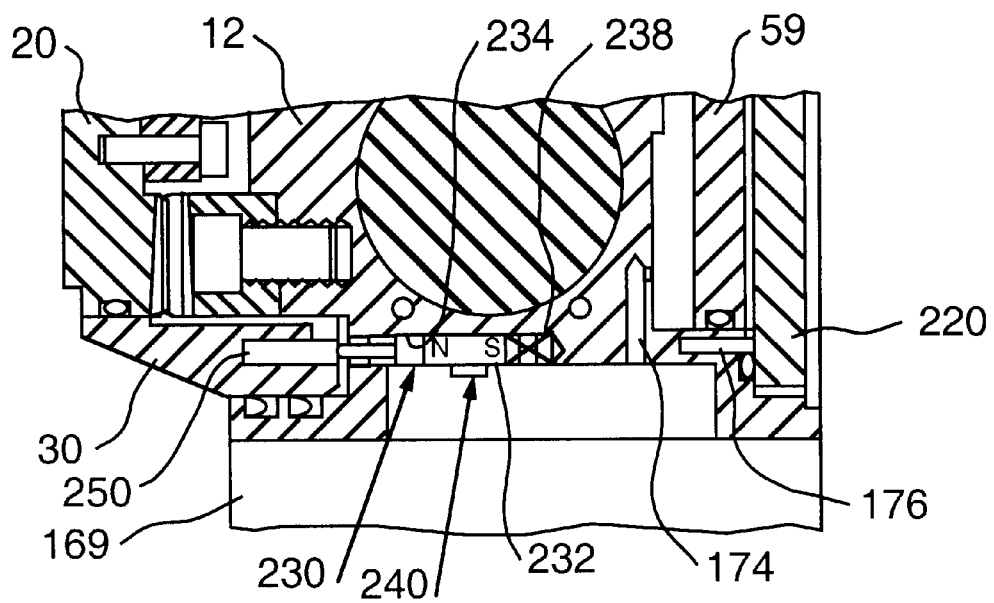
FIG. 13 is another partial cross-sectional view of the portion of the present indexable apparatus with the slide assembly thereof in a second position indicating that the indexable support table is in a specified rotational position.

To avoid the possibility of commencing the indexing sequence when the indexing apparatus 10 is not in a "zero" or "home" position, a second detector arrangement 230 fabricated in the manner described above, may also be employed. As shown in FIGS. 12 and 13, the second detector arrangement 230 may comprise a magnet member 232 that is slidably received in a corresponding bore 234 in the housing 12. Magnet member 232 has an actuator portion 236 that protrudes from the bore 224 towards the scale ring 30. A spring 238 is also employed to bias the magnet member 232 towards the scale ring 30. A third magnetic sensor 240 is mounted adjacent the second detector arrangement 230 for sensing the position of the magnet member 232 within the bore 234. In addition, an actuator pin 250 is attached to the scale ring 30 such that when the indexable support table 20 has been indexed to a starting position, the actuator pin 250 biases the actuator portion 236 of the magnet member 232 to a position wherein it can be detected by the third magnetic sensor 240. The third magnetic sensor 240 sends a signal to the controller 169 which may, for example, send an electrical signal to an indicator light (not shown) or sound generating device (not shown) that would inform operating personnel that the indexable support table 20 is in the starting position. In the alternative, the starting signal could be used to initiate the indexing sequence or sent to a controller that operates the machine tool for use thereby.

The operation of the apparatus 10 will now be described. Prior to commencing indexing procedure, the apparatus 10 is locked in the "first state" position as shown in FIGS. 2, 3 and 5. When the apparatus 10 is in that locked position, valve 172 permits a primary amount of pressurized fluid to flow from the source 170 through port 174 into the primary chamber 260 in the housing 12 and exhausts fluid through port 176 from the first chamber 224 to apply a locking force which biases the piston 50 in the second axial direction represented by arrow "B". The skilled artisan will appreciate that, should fluid pressure be lost to the device 10 when the device is in the locked position, the springs 48 serve to retain the first coupling 45 in intermeshing engagement. Such aspect of the present invention represents an improvement over prior fluid-actuated indexing apparatuses that typically become unlocked when the supply of fluid pressure to the device is lost or interrupted.

Also in the first state, control valve 178 admits a second amount of pressurized fluid through port 180 to the second chamber 119 and exhausts fluid through port 182 from the secondary chamber 121 to bias the rack sleeve 90 in the direction of arrow "D" until the rack sleeve 90 stops against the end cap 100. When the rack sleeve 90 is in this ending position, a wrench 134 may be inserted into the cap screw 132 to rotate the selector shaft 110 to one of the plurality of selectable indexing angles. The reader will appreciate that this step may be omitted if the selector shaft 110 is in the position defining the amount of desired angular travel of the indexing table 20.

To initiate an indexing cycle, the controller 169 shifts the valve 178 to vent the second amount of pressurized fluid from the second chamber 119 and admit a secondary amount of pressurized fluid from the source 170 into the secondary chamber 121 which biases the rack sleeve 90 in the G direction until the pin 102 contacts the end of the selected axial groove in the selector shaft 110. This motion of the rack sleeve 90 rotates the pinion gear 72' but does not rotate the indexable support table 20 because the second coupling 89 is not engaged, and because the first coupling 45 is engaged.

The controller 169 then shifts the valve 172 to permit a first amount of pressurized fluid to flow from the source 170 through port 176 and into the first chamber 224 and permits fluid to be exhausted from the primary chamber 260. As the first amount of pressurized fluid enters the first chamber 224, piston assembly 50' is biased in the first axial direction represented by arrow "F" which causes the primary teeth 76 of the pinion gear 72' to engage the secondary teeth 27 on the underside 21 of the indexable support table 20. See FIG. 7. Thus, the first coupling 45 and the second coupling 89 are engaged. Further admittance of the first amount of pressurized fluid into the first chamber 224, causes the piston 50 to bias the pinion gear 72' in the first axial "F" direction represented by arrow such that the teeth 76 engage the teeth 27 on the indexable support table 20 and the pinion gear 72' biases the indexable support table 20 until the first coupling 45 becomes disengaged (i.e., the teeth 23' of the second retainer 23 no longer mesh with the teeth 40 of the first retainer 40). See FIG. 8.

After the indexable support table 20 has been axially biased to a position wherein the first coupling 45 is disengaged, the controller 169 shifts the second control valve 178 back to the position shown in FIG. 5, admitting a second amount of pressurized fluid to second chamber 119 and exhausting fluid from secondary chamber 121, thus moving rack sleeve 90 in the direction of arrow "D" until it reaches the end position shown in FIG. 3. During this motion, the rack sleeve 90 rotates the pinion gear 72' which rotates the indexable support table 20 a desired distance about first axis A—A.

Figure 14:
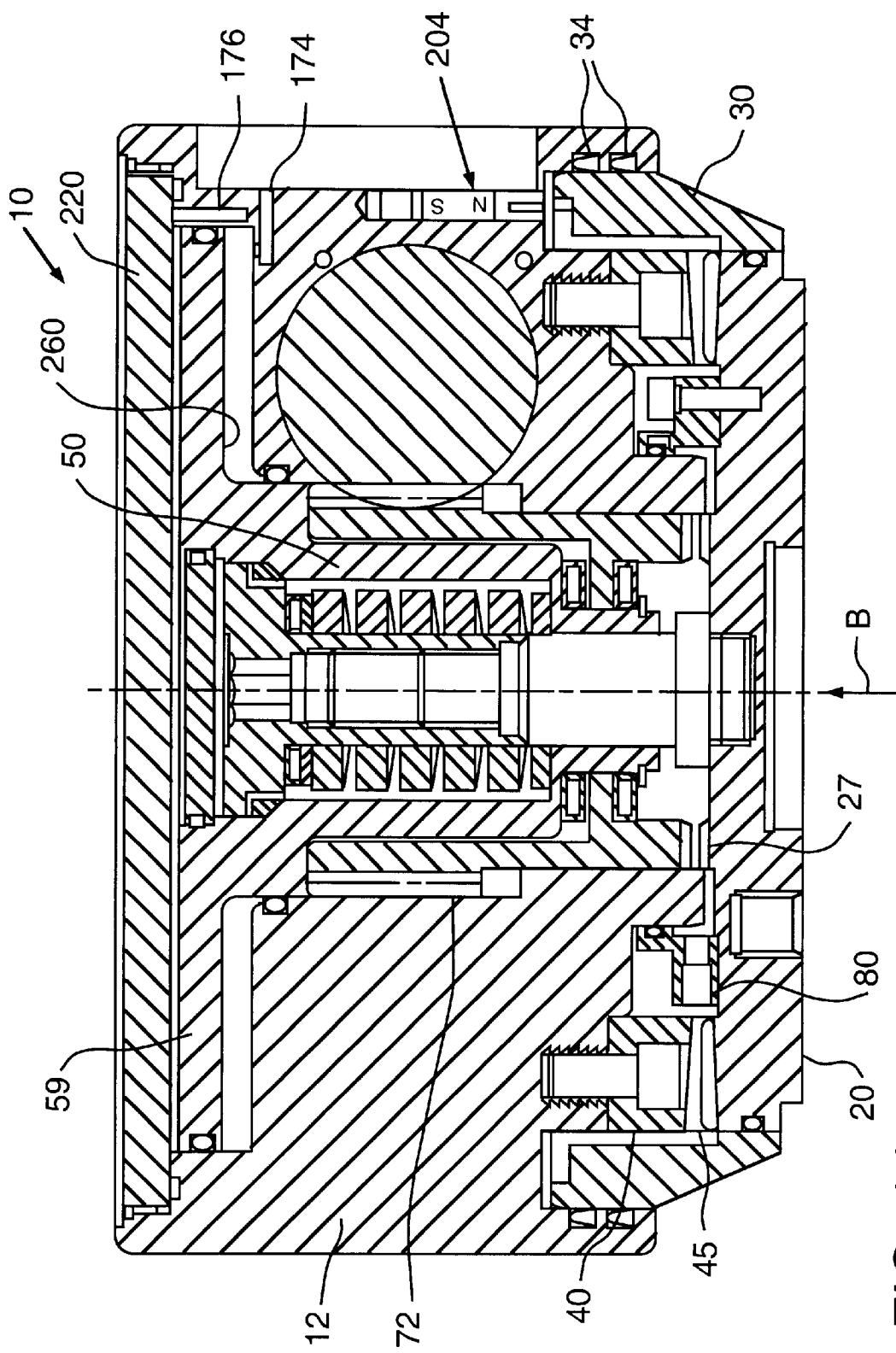
FIG. 14 is another cross-sectional plan view of the indexable apparatus of the present invention with the indexable support table thereof in one of a plurality of locked positions.

After the indexable support table 20 has been indexed to the desired position, the first control valve 172 shifts back to the position shown in FIG. 5, admitting pressurized fluid through port 174 and into the primary chamber 260 and exhausting fluid from the first chamber 224 to bias the piston 50 in the second axial direction represented by arrow "B" direction. See FIG. 14. The piston 50 and pinion gear 72' continue to move in the second axial direction represented by arrow "B" until piston 50 stops against the spherical bearing 51 and the shaft nut 62; at this point the second coupling 89 is completely disengaged and all members have returned to the "first" state described above. When in this position, the pinion gear 72' can be rotated about the piston hub 52 without rotating the indexable support table 20. The rack sleeve 90 is in the ending position which permits the selector shaft 110 to again be rotated to a desired indexing angle for the next indexing cycle.

The present indexable device can be used in numerous applications wherein an item or a collection of items must be very precisely indexed to positions about an axis and retained in those positions even under the influence of substantial external forces. The present indexable device is relatively compact and can be incorporated into various other support structures as desired. In addition, when compared to a number of other indexable apparatuses, the present indexable device is relatively inexpensive and easy to operate. Moreover, the present indexable apparatus will be retained in a locked position should the supply of pressurized fluid to the device be interrupted or discontinued. The present invention also provides a means for automatically determining whether the indexable support table is in the zero or home position prior to initiating any machining operations. In addition, the present invention may be provided with means for automatically determining when the indexable support table is in a locked position.

Thus, the present invention provides solutions to the aforementioned problems associated with prior fluid-actuated indexable apparatuses. While such advantages are apparent from the foregoing disclosure, it will be understood that various changes in the details, materials and arrangements of parts which have been herein described and illustrated in order to explain the nature of the invention may be made by those skilled in the art within the principle and scope of the invention as expressed in the appended claims.

What is claimed is:

1. An indexable apparatus, comprising:

a housing;

an indexable support table movably supported on said housing for selective axial and rotational travel about a first axis;

a first retainer on said housing;

a second retainer on said indexable support table for selective engagement with said first retainer to non-rotatably retain said indexable support table in a desired position;

an axial displacement member movably supported within said housing for selective engagement with said indexable support table to bias said indexable support table in a first axial direction along said first axis such that said second retainer is biased out of engagement with said first retainer;

an axial biasing member in biasing engagement with said axial displacement member to retain said axial displacement member in engagement with said indexable support table to prevent said indexable support table from rotating about said first axis as said second retainer is disengaged from said first retainer; and a rotator supported within said housing for selectively applying a rotational force to said axial displacement member when said axial displacement member is engaged with said indexable support table to cause said indexable support table to rotate about said first axis after said second retainer has disengaged said first retainer.

2. The indexable apparatus of claim 1 further comprising at least one first biasing member supported in said housing to bias said indexable support table in a second axial direction along said first axis such that said second retainer re-engages said first retainer after said indexable support table has rotated a desired distance about said first axis.

3. The indexable apparatus of claim 1 wherein said first retainer comprises a first ring of teeth and wherein said second retainer comprises a second ring of teeth engagable with said first ring of teeth.

4. The indexable apparatus of claim 1 wherein said axial displacement member has a primary ring of teeth to selectively mesh with a secondary ring of teeth on said indexable support table.

5. The indexable apparatus of claim 1 further comprising a fluid-actuatable piston movably supported within said housing and defining a first chamber within said housing such that, upon an application of a first amount of pressurized fluid to said first chamber, said piston biases said axial displacement member in said first axial direction along said first axis.

6. The indexable apparatus of claim 5 wherein said fluid-actuatable piston defines a primary chamber in said housing such that upon an application of a primary amount of pressurized fluid into said primary chamber, said piston biases said axial displacement member in a second axial direction along said first axis that is opposite to said first axial direction.

7. The indexable apparatus of claim 1 further comprising a fluid-actuatable piston movably supported within said housing and defining a first chamber within said housing such that, upon an application of a first amount of pressurized fluid to said first chamber, said piston biases said axial displacement member in said first axial direction along said first axis, said fluid-actuatable piston further defining a primary chamber in said housing such that upon an application of a primary amount of pressurized fluid into said primary chamber, said piston biases said axial displacement member in a second axial direction along said first axis that is opposite to said first axial direction.

8. The indexable apparatus of claim 7 further comprising an indexing shaft supported within said housing to selectively engage said fluid-actuated piston upon said application of said primary amount of pressurized fluid to said primary chamber to bias said indexable support table in said second axial direction along said first axis.

9. The indexable apparatus of claim 8 further comprising at least one first spring located between a portion of said housing and said fluid-actuatable piston.

10. The indexable apparatus of claim 1 wherein said rotator comprises a fluid-actuatable rack member movably supported within said housing and having a plurality of teeth thereon in meshing engagement with corresponding gear teeth on said axial displacement member, said fluid-actuatable rack member defining second and secondary chambers in said housing such that upon an application of said pressurized fluid into said second chamber, said fluid actuatable rack member moves axially along a second axis from a preselected one of a plurality of beginning positions to an ending position to impart a rotary force to said axial displacement member and is returned to said preselected one of a plurality of beginning positions when said pressurized fluid is discontinued from said second chamber and is applied to said secondary chamber.

11. The indexable apparatus of claim 10 further comprising a shock absorber attached to said fluid-actuatable rack member for damping the axial travel of said fluid-actuatable actuatable rack member when said fluid-actuatable rack member is axially traveling from any one of said preselected beginning positions to said ending position.

12. The indexable apparatus of claim 10 wherein said fluid-actuatable rack member further comprises:

a hollow rack sleeve slidably supported within said housing; and a selector shaft rotatably supported within said hollow rack sleeve, said selector shaft having a plurality of elongated grooves of differing lengths therein arranged to be selectively engaged by a stop member in said rack sleeve such that when said stop member engages an end of any one of said grooves, said rack sleeve will be limited to a predetermined amount of axial travel along said second axis.

13. The indexable apparatus of claim 1 further comprising a detector attached to said housing and said indexable support table for detecting when said indexable support table is in a specified rotational position.

14. The indexable apparatus of claim 13 wherein said detector comprises:

a slide assembly slidably supported within said housing;

a sensor affixed to said housing adjacent to said slide assembly, said sensor generating a control signal when said slide assembly is in a first position; and an actuator affixed to said indexable support table and oriented for selected contact with said slide assembly such that said slide assembly is biased by said actuator into said first position when said indexable support table is engaged in said specified rotational position about said first axis.

15. The indexable apparatus of claim 14 wherein at least a portion of said slide assembly is magnetic and wherein said sensor comprises a magnetic detector.

16. The indexable apparatus of claim 1 further comprising an indicator for generating a control signal indicating that said second retainer on said indexable support table is engaged with said first retainer on said housing.

* * * * *